United States Patent
Yen

(10) Patent No.: US 9,684,346 B2
(45) Date of Patent: Jun. 20, 2017

(54) POWER SUPPLY

(71) Applicant: HON HAI PRECISION INDUSTRY CO., LTD., New Taipei (TW)

(72) Inventor: Chien-Chung Yen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 92 days.

(21) Appl. No.: 14/470,536

(22) Filed: Aug. 27, 2014

(65) Prior Publication Data

US 2016/0062419 A1    Mar. 3, 2016

(51) Int. Cl.
*H05K 5/00* (2006.01)
*G06F 1/18* (2006.01)

(52) U.S. Cl.
CPC .................................. *G06F 1/188* (2013.01)

(58) Field of Classification Search
CPC .................................. G06F 1/188; G06F 1/189
USPC ............ 439/266; 70/58; 361/679.01–679.45, 361/679.55–679.59, 724–727
See application file for complete search history.

(56) References Cited

U.S. PATENT DOCUMENTS

| | | | | |
|---|---|---|---|---|
| 5,949,652 A | * | 9/1999 | McAnally | G06F 1/184 361/725 |
| 6,178,086 B1 | * | 1/2001 | Sim | G06F 1/181 312/223.2 |
| 6,439,917 B2 | * | 8/2002 | Tonozuka | G06F 1/181 439/372 |
| 2004/0092144 A1 | * | 5/2004 | Schmid | G06F 1/18 439/136 |
| 2006/0002079 A1 | * | 1/2006 | Xu | G06F 1/182 361/679.02 |
| 2011/0155447 A1 | * | 6/2011 | Nihashi | G06F 1/181 174/520 |

* cited by examiner

*Primary Examiner* — Nidhi Thaker
(74) *Attorney, Agent, or Firm* — Steven Reiss

(57) ABSTRACT

A power supply includes a main body having a coupling face and a handlebar. The coupling face includes a first end and a second end forming a power socket. The handlebar includes a first beam coupled to the first end and a second beam. The first beam extends a tab outwardly. The handlebar defines a window configured to expose the power socket. The handlebar is transitionable between: (i) a first configuration in which the second beam couples the second end, the window corresponds and exposes the power socket, the tab extends toward a first direction, and (ii) a second configuration in which the second beam is remote from the second end, the window is remote from the power socket, and the tab extends toward a second direction different from the first direction. A method for removing the power supply from a case of an electronic device is also provided.

8 Claims, 4 Drawing Sheets

POWER SUPPLY

FIELD

The present disclosure relates to power supplies, and more particularly to a power supply for an electronic device.

BACKGROUND

Generally, power supplies are used for supplying electric power to electronic devices such as computers or servers.

DETAILED DESCRIPTION

Figure 1:
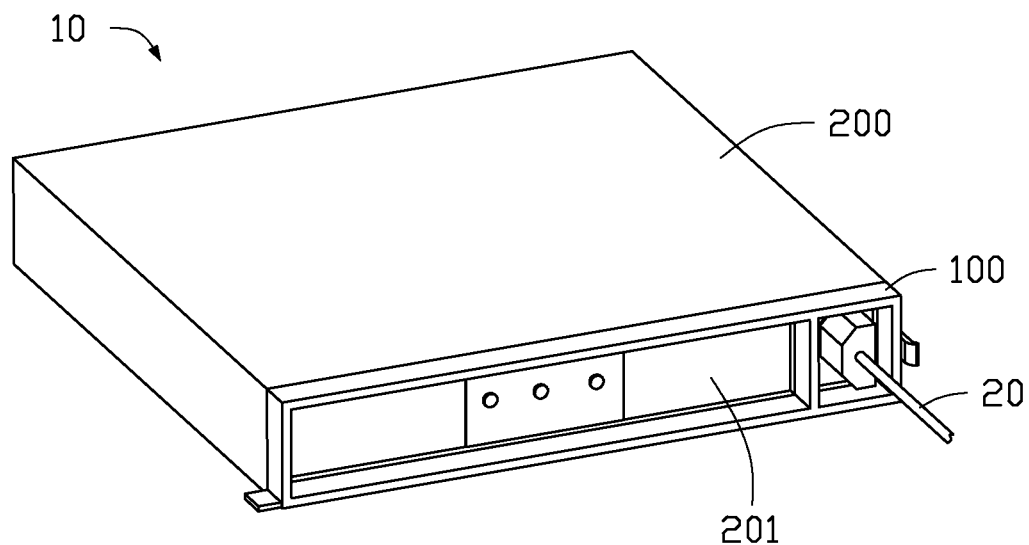
FIG. 1 is an assembled, isometric view of a power supply with a power cord in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a power supply. The power supply can include a main body having a coupling face and a handlebar coupled to the coupling face. The coupling face includes a first end and a second end opposite to the first end, the second end forming a power socket. The handlebar can include a first beam coupled to the first end of the coupling face and a second beam opposite to the first beam. The first beam extends a tab outwardly configured to resist an environment member. The handlebar defines a window configured to expose the power socket. The handlebar is transitionable between: (i) a first configuration in which the second beam of the handlebar couples the second end of the coupling face of the main body, the window of the handlebar corresponds the power socket and exposes the power socket, the tab of the handlebar extends toward a first direction, and (ii) a second configuration in which the second beam of the handlebar is remote from the second end of the coupling face of the main body, the window is remote from the power socket, and the tab of the handlebar extends toward a second direction different from the first direction.

The present disclosure is described further in relation to a method for removing a power supply and a power core from a case of an electronic device. The power supply can include a main body and a handlebar coupled to the main body. The main body includes a power socket. The handlebar includes a tab and a coupling member. The handlebar defines a window corresponding to the power socket. The method can include: removing the power cord from the power socket of the main body and the window of the handlebar; disengaging the coupling member of the handlebar from the case of the electronic device; and pulling the handlebar to have the tab of the handlebar resisting the case of the electronic device, the power supply being pushed outwardly by the case of the electronic device.

Figure 2:
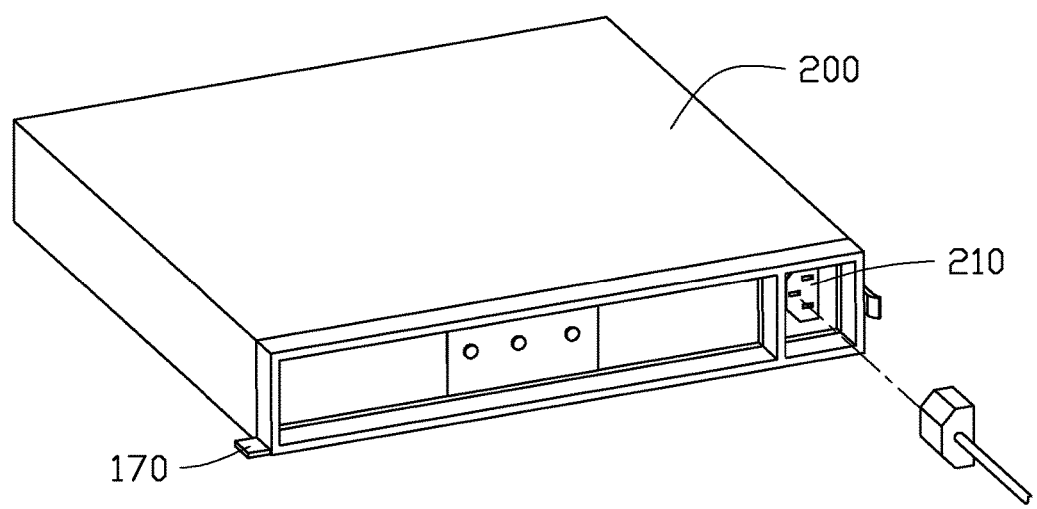
FIG. 2 is an exploded, isometric view of the power supply and the power cord in FIG. 1.

FIG. 1 and FIG. 2 illustrate a power supply 10 with a power cord 20, configured to supply electric power to electronic devices. The power supply 10 can include a main body 200 and handlebar 100 at an end of the main body 200. The power cord 20 can be attached to the end of the main body 200.

The main body 200 of the power supply 10 can include a coupling face 201 at the end of the main body 200. The coupling face 201 has a first end and a second end opposite to the first end, the second end of the coupling face 201 forms a power socket 210 configured to couple the power cord 20.

Figure 3:
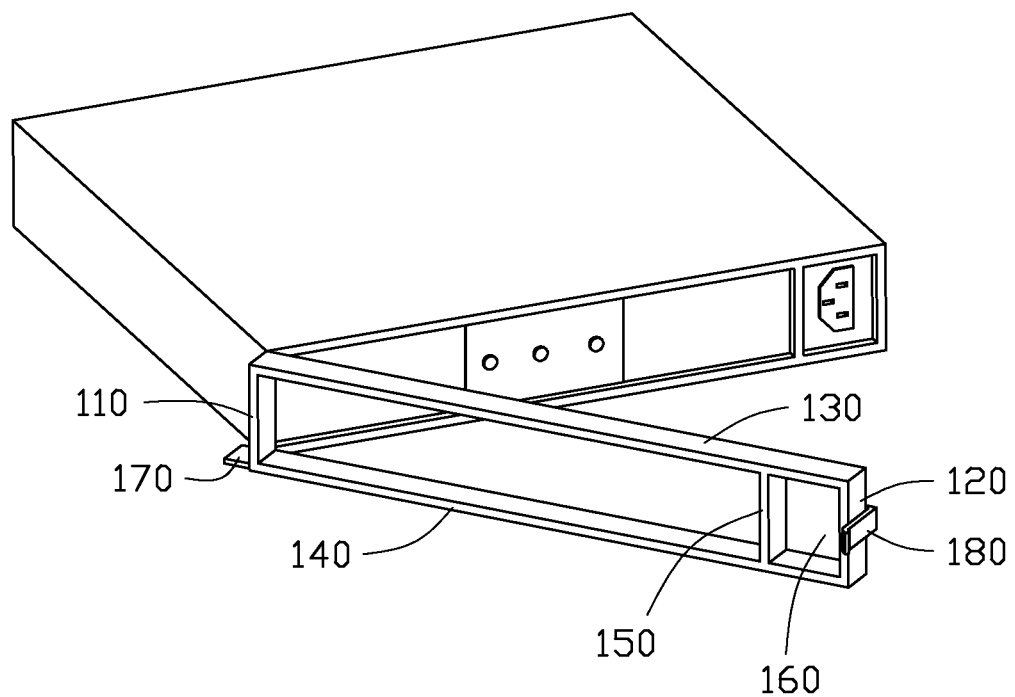
FIG. 3 is an isometric view of the power supply in FIG. 2, wherein a handlebar of the power supply is pulled from a main body of the power supply.

Referring to FIG. 3, the handlebar 100 can be a frame including a plurality of interconnecting beams. The beams can include a first beam 110 coupled to the main body 200, a second beam 120 opposite to the first beam 110, a third beam 130 and a forth beam 140 located between and connecting the first beam 110 and the second beam 120. The first beam 110 can be pivotally coupled to the first end of the coupling face 201 of the main body 200. The first beam 110 extends a tab 170 (shown in FIG. 2) outwardly adjacent to a joint of the first beam 110 and the forth beam 140. The second beam 120 extends a coupling member 180 outwardly from a middle portion thereof. The coupling member 180 can be a tenon. The coupling member 180 has an end thereof extending beyond the second beam 120 along a width direction of the second beam 120. The handlebar 100 can further include a connecting beam 150 located between the first beam 110 and the second beam 120. The connecting beam 150 connects the third beam 130 and the forth beam 140. The connecting beam 150 is located adjacent to the second beam 120 and remote from the first beam 110. The connecting beam 150, the second beam 120, the third beam 130 and the forth beam 140 cooperative define a window 160. The first beam 110 is substantially parallel to the second beam 120 and the connecting beam 150. The third beam 130 is substantially parallel to the forth beam 140. The third beam 130 is substantially perpendicular to the first beam 110. The tab 170 is substantially perpendicular to the first beam 110. The third beam 130 has a length larger than that of the first beam 110 and the second beam 120.

Referring to FIG. 1 again, when the handlebar 100 is attached to the main body 200 completely, the handlebar 100 is in a first configuration. The first beam 110, the second beam 120, the third beam 130 and the forth beam 140 are respectively corresponding to four sides of the coupling face 201 of the main body 200. The second beam 120 can be coupled to the second end of the coupling face 201 of the main body 200. The third beam 130 and the forth beam 140 can be coupled to top and bottom sides of the coupling face 201, respectively. The tab 170 of the handlebar 10 extends toward a first direction. The coupling member 180 can couple an environment member to retain the power supply 10 to the environment member such as a computer case or a server case. The window 160 is corresponding to the power socket 210, i.e., the power socket 210 is exposed via the window 160. The power cord 20 can extend through the window 160 and couple the power socket 210.

Referring to FIG. 3 again, when the handlebar 100 is pulled from the main body 200, the handlebar 100 is in a second configuration. The handlebar 100 can rotate about the first beam 110 pivotally coupled to the main body 200. The second beam 120 moves from and is remote from the second end of the coupling face 201 of the main body 200. The third beam 130 and the forth beam 140 move from the top and bottom side of the coupling face 201 of the main body 200. The window 160 is remote from the power socket 210 of the coupling face 201. The tab 170 moves toward the main body 200 and extends towards a second direction different from the first direction, for resisting the environment member to drive the main body 200 to move outwardly from the environment member.

Figure 4:
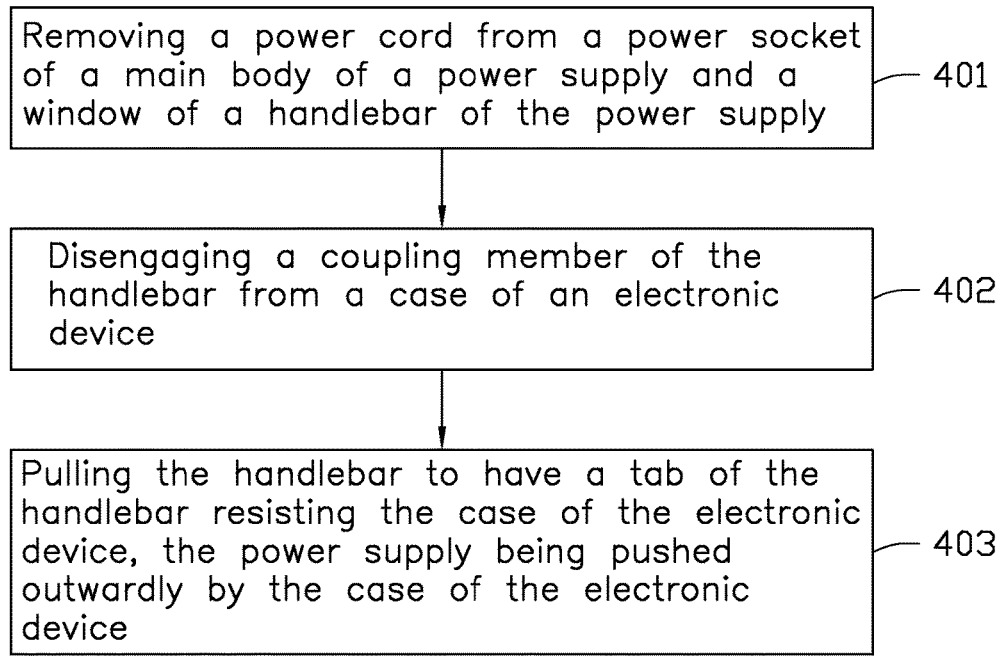
FIG. 4 is flow chart of a method for removing the power supply and the power cord in FIG. 1.

FIG. 4 illustrates a method for removing the power supply 10 and the power cord 20 from a case of an electronic device such as a computer or a server. The method can begin from a block 401.

In block 401, the power cord 20 is removed from the power socket 210 of the main body 200 and the window 160 of the handlebar 100 of the power supply 10.

In block 402, the coupling member 180 of the handlebar 100 is disengaged from the case of the electronic device.

In block 403, the handlebar 100 is pulled to remove the second beam 120 from the main body 200, the tab 170 of the handlebar 100 resists the case of the electronic device, and the power supply 10 is pushed outwardly by the case of the electronic device.

In this method, if the handlebar 100 is pulled to have the second beam 120 removing from the main body 200 firstly, before the power cord 20 is removed from the power socket 210 of the main body 200 and the window 160 of the handlebar 100 of the power supply 10, the handlebar 100 will be interfered by the power cord 20 in the window 160, the handlebar 100 cannot be further pulled to have the tab 170 of the handlebar 100 resisting the case of the electronic device, so the power supply 10 cannot be pushed outwardly by the case of the electronic device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A power supply comprising:
 a main body having a coupling face, the coupling face comprising a first end and a second end opposite to the first end, the second end forming a power socket configured to couple a power cord; and
 a handlebar coupled to the coupling face of the main body, the handlebar comprising a first beam coupled to the first end of the coupling face, a second beam opposite to the first beam, a third beam and a fourth beam connecting the first beam and the second beam, the first beam extending a tab outwardly from a joint of the first beam and the fourth beam along the fourth beam and configured to resist an environment member, the handlebar defining a window configured to expose the power socket;
 wherein the handlebar is transitionable between: (i) a first configuration in which the second beam of the handlebar couples the second end of the coupling face of the main body, the window of the handlebar corresponds to the power socket and exposes the power socket, the tab of the handlebar extends toward a first direction, and (ii) a second configuration in which the second beam of the handlebar is remote from the second end of the coupling face of the main body, the window is remote from the power socket, and the tab of the handlebar extends towards a second direction different from the first direction; the tab resists the environment member when the handlebar is being rotated between the first configuration and the second configuration, so that the power supply is pushed by the environment member.

2. The power supply of claim 1, wherein a middle portion of the second beam of the handlebar extends a coupling member outwardly configured to couple the environment member.

3. The power supply of claim 2, wherein the coupling member has an end thereof extending beyond the second beam along a width direction of the second beam.

4. The power supply of claim 1, wherein the handlebar further comprises a connecting beam connecting the third beam and the fourth beam, the connecting beam being adjacent to the second beam.

5. The power supply of claim 4, wherein the second beam, the connecting beam, the third beam and the fourth beam cooperatively define the window.

6. The power supply of claim 1, wherein the first beam of the handlebar is pivotally coupled to the first end of the coupling face of the main body.

7. The power supply of claim 1, wherein the tab is perpendicular to the first beam.

8. The power supply of claim 1, wherein the first beam is parallel to the second beam.

* * * * *